(12) United States Patent
Rydelek et al.

(10) Patent No.: US 6,480,675 B2
(45) Date of Patent: Nov. 12, 2002

(54) ONE-TIME-USE CAMERA WITH CARTRIDGE RETAINER TO ENSURE FILM-ON-SPROCKET RETENTION DURING CAMERA ASSEMBLY

(75) Inventors: James G. Rydelek, Henrietta, NY (US); Joseph A. Watkins, Rochester, NY (US); Robert F. Zwaap, Rochester, NY (US); Michael L. Dececca, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/780,160

(22) Filed: Feb. 9, 2001

(65) Prior Publication Data

US 2002/0150396 A1 Oct. 17, 2002

(51) Int. Cl.$^7$ .............................................. G03B 17/02
(52) U.S. Cl. ........................... 396/6; 396/388; 396/514; 396/440
(58) Field of Search ................................ 396/6, 535, 388, 396/512, 514, 440

(56) References Cited

U.S. PATENT DOCUMENTS

| | | | |
|---|---|---|---|
| 5,016,034 A | | 5/1991 | Goto |
| 5,581,321 A | * | 12/1996 | Boyd ........................ 396/535 |
| 5,721,964 A | * | 2/1998 | Pearson ........................ 396/6 |
| 5,778,269 A | | 7/1998 | Williams |
| 5,812,884 A | | 9/1998 | Sangregory |
| 5,842,067 A | | 11/1998 | Williams |
| 5,895,125 A | * | 4/1999 | Sangregory et al. ........... 396/6 |
| 5,905,916 A | | 5/1999 | Kamata |
| 5,923,905 A | * | 7/1999 | Solomon ........................ 396/6 |
| 5,937,209 A | | 8/1999 | Pearson et al. |
| 5,974,266 A | | 10/1999 | DiRisio et al. |
| 6,014,521 A | * | 1/2000 | Dussinger ........................ 396/6 |
| 6,094,533 A | * | 7/2000 | Allen et al. ................. 396/388 |

* cited by examiner

Primary Examiner—Russell Adams
Assistant Examiner—Michelle P Nguyen
(74) Attorney, Agent, or Firm—Rogers A. Fields

(57) ABSTRACT

A partially assembled one-time-use camera includes a film section that longitudinally extends from a rotatable film winding spool in a film cartridge and that is engaged with a rotatable metering sprocket, and a separate rear cover part that is to be placed over the film section and the film cartridge and is constructed to prevent the film section from retracting out of engagement with the metering sprocket. The film winding spool is rotatable in a film winding direction to wind the film section into the film cartridge. If the film cartridge is allowed to rotate in the film winding direction before the rear cover is placed over the film section and the film cartridge, the film section will retract out of engagement with the metering sprocket. Consequently, a cartridge retention piece is positioned against the film cartridge to prevent the film cartridge from being rotated in the film winding direction. This prevents the film section from retracting out of engagement with the metering sprocket when the rear cover part is not placed over the film section and the film cartridge.

17 Claims, 5 Drawing Sheets

ONE-TIME-USE CAMERA WITH CARTRIDGE RETAINER TO ENSURE FILM-ON-SPROCKET RETENTION DURING CAMERA ASSEMBLY

FIELD OF THE INVENTION

The invention relates generally to the field of photography, and in particular to disposable single-use or one-time-use cameras. More specifically, the invention relates to a one-time use camera with a means to ensure film-on-sprocket retention during camera assembly.

BACKGROUND OF THE INVENTION

Film and cameras that are all in one, commonly referred to as disposable single-use or one-time-use cameras, have become well known. The one-time-use camera is a simple point-and-shoot type camera comprising a conventional film cartridge within a cartridge receiving chamber in a main body part, an unexposed film roll prewound from the film cartridge onto a film supply spool within a film supply chamber in the main body part, a film-exposing backframe opening between the cartridge receiving and film supply chambers in the main body part, a fixed-focus taking lens, a film metering mechanism with a rotatably supported metering sprocket that has respective sprocket teeth for engaging the filmstrip at successive film perforations, a manually rotatable film winding thumbwheel coaxially engaged with a film winding spool inside the film cartridge, a single-blade shutter, a manually depressible shutter release button, an exposure counter wheel that has a numerical series of evenly spaced exposure count indicia and is incrementally rotated to successively view the exposure count indicia, an anti-backup pawl that engages the exposure counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film winding spool inside the film cartridge. This winds an exposed frame of the filmstrip from the backframe opening into the film cartridge and advances an unexposed frame of the filmstrip from the unexposed film roll to the backframe opening. The rewinding movement of the filmstrip the equivalent of slightly more than one frame width rotates the metering sprocket in engagement with the filmstrip to decrement the exposure counter wheel to its next lower-numbered indicia and to pivot a metering lever into engagement with the thumbwheel in order to prevent further manual rotation of the thumbwheel in the film winding direction. Manually depressing the shutter release button to take another picture pivots the metering lever out of engagement with the thumbwheel to permit renewed rotation of the thumbwheel in the film winding direction. When the maximum number of exposures available on the filmstrip have been made and the filmstrip is completely wound into the film cartridge, the one-time-use camera is given to a photofinisher who separates the rear cover part from the main body part and removes the film cartridge with the exposed filmstrip from the cartridge receiving chamber. Then, he removes the exposed filmstrip from the film cartridge to develop the latent images and make prints for the customer.

Problem

During assembly of the one-time-use camera, an intermediate film section that longitudinally extends between the film winding spool in the film cartridge and the film supply spool is engaged with the metering sprocket via the sprocket teeth and the film perforations. Then, the rear cover part is connected to the main body part and/or to the front cover part to make the main body part light-tight. The rear cover part has several film guiding ribs that hold the intermediate film section engaged with the metering sprocket.

When the one-time-use camera is only partially assembled, i.e., before the rear cover part is connected to the main body part and/or to the front cover part, the intermediate film section between the film winding spool in the film cartridge and the film supply spool can retract out of engagement with the metering sprocket. This is because of the natural tendency of the film section to bow away from the metering sprocket and the ease with which the film cartridge can rotate in the film winding direction within the cartridge receiving chamber. If the film section disengages from the metering sprocket and is not re-engaged with the metering sprocket before the rear cover part is connected to the main body part and/or to the front cover part, the one-time-use camera will be inoperative.

SUMMARY OF THE INVENTION

The invention proposes a means to maintain film-on-sprocket retention during assembly of a one-time-use camera, i.e., before the rear cover part is connected to the main body part and/or to the front cover part.

According to one aspect of the invention, a partially assembled one-time-use camera comprising a film section that longitudinally extends from a rotatable film winding spool in a film cartridge and that is engaged with a rotatable metering sprocket, and a separate rear cover part that is to be placed over the film section and the film cartridge and is constructed to prevent the film section from retracting out of engagement with the metering sprocket, is characterized in that:

the film winding spool is rotatable in a film winding direction to wind the film section into the film cartridge, and the film section will retract out of engagement with the metering sprocket when the film cartridge is allowed to rotate in the film winding direction; and a cartridge retention piece is positioned against the film cartridge to prevent the film cartridge from being rotated in the film winding direction when the rear cover part is not placed over the film section and the film cartridge, in order to prevent the film section from retracting out of engagement with the metering sprocket before the rear cover part is in place.

According to another aspect of the invention, a method of partially assembling a one-time-use camera, comprises:

placing a cartridge retention piece on top of a film cartridge to position a depending tab of the cartridge retention piece against a film passage snout of the film cartridge; and engaging the cartridge retention piece with a main body part as the film cartridge is inserted into a chamber in the main body part, in order for the tab to prevent the film cartridge from being rotated within the chamber.

According to another aspect of the invention, a film delivering unit comprises:

a film cartridge including a cartridge shell, a rotatable film winding spool that is inside the cartridge shell and has a spool end portion that is accessible from outside the cartridge shell;

a film winding thumbwheel coaxially engaged with the spool end portion to rotate the film winding spool in a film winding direction; and a cartridge retention piece between the film winding thumbwheel and the cartridge shell that is engageable to prevent rotation of the cartridge shell in the film winding direction when the film winding spool is rotated in that direction. Preferably, the cartridge shell has a film passage snout, and the cartridge retention piece has a tab against the snout to prevent the cartridge shell from being rotated in the film winding direction.

DETAILED DESCRIPTION OF THE INVENTION

Figure 1:
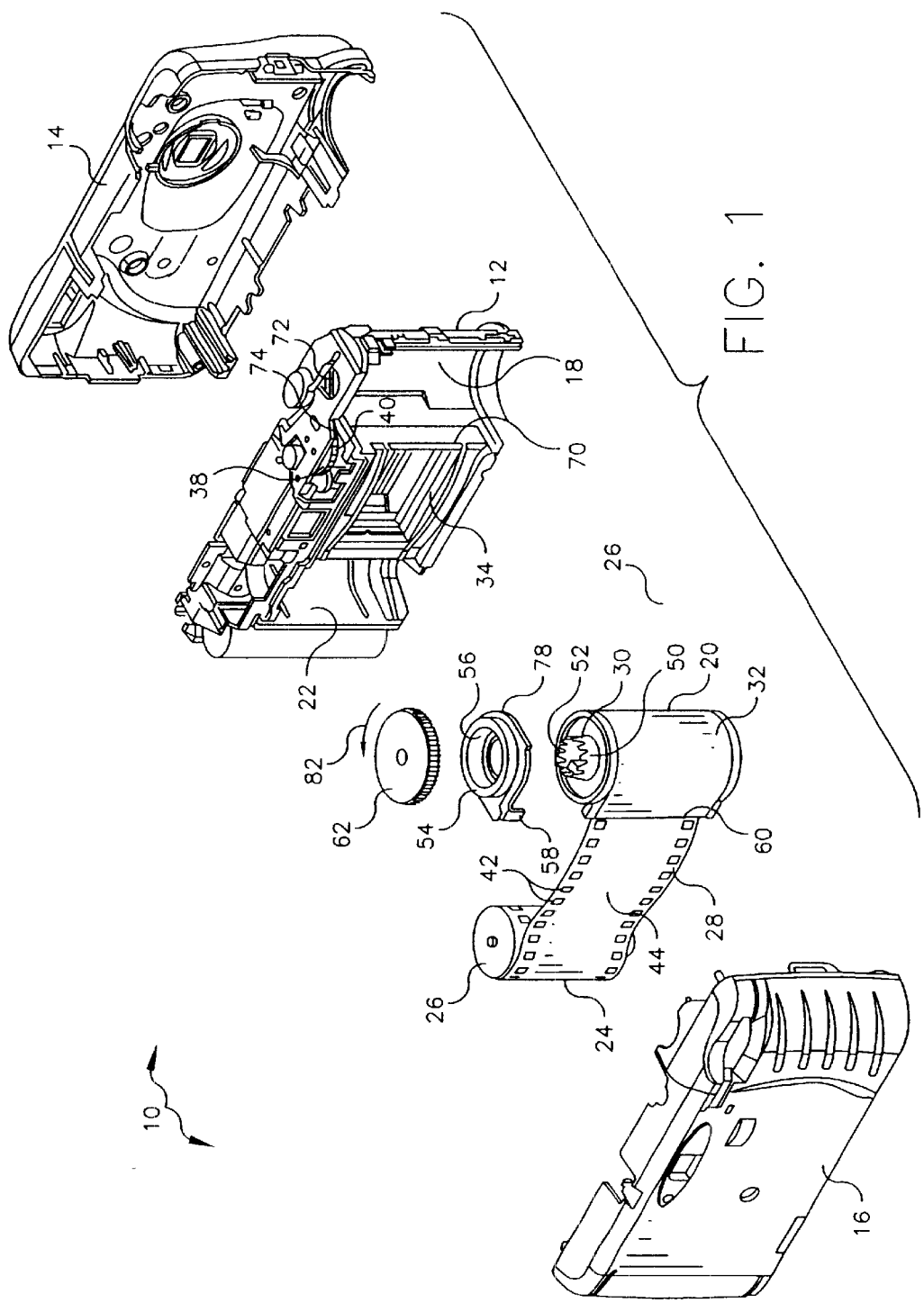
FIG. 1 is an exploded rear perspective view of a one-time-use camera that is an embodiment of the invention.

The invention is disclosed as being embodied preferably in a disposable one-time-use camera. Because the features of a one-time-use camera unit are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1 and 3–5 show a disposable one-time-use camera 10 including a plastic opaque main body part 12, a plastic opaque front cover part 14, and a plastic opaque rear cover part 16. The front cover part 14 and the rear cover part 16 house the main body part 12 between them and are connected releasably to one another and to the main body part 12 via known hook-in-hole connections.

Figure 2:
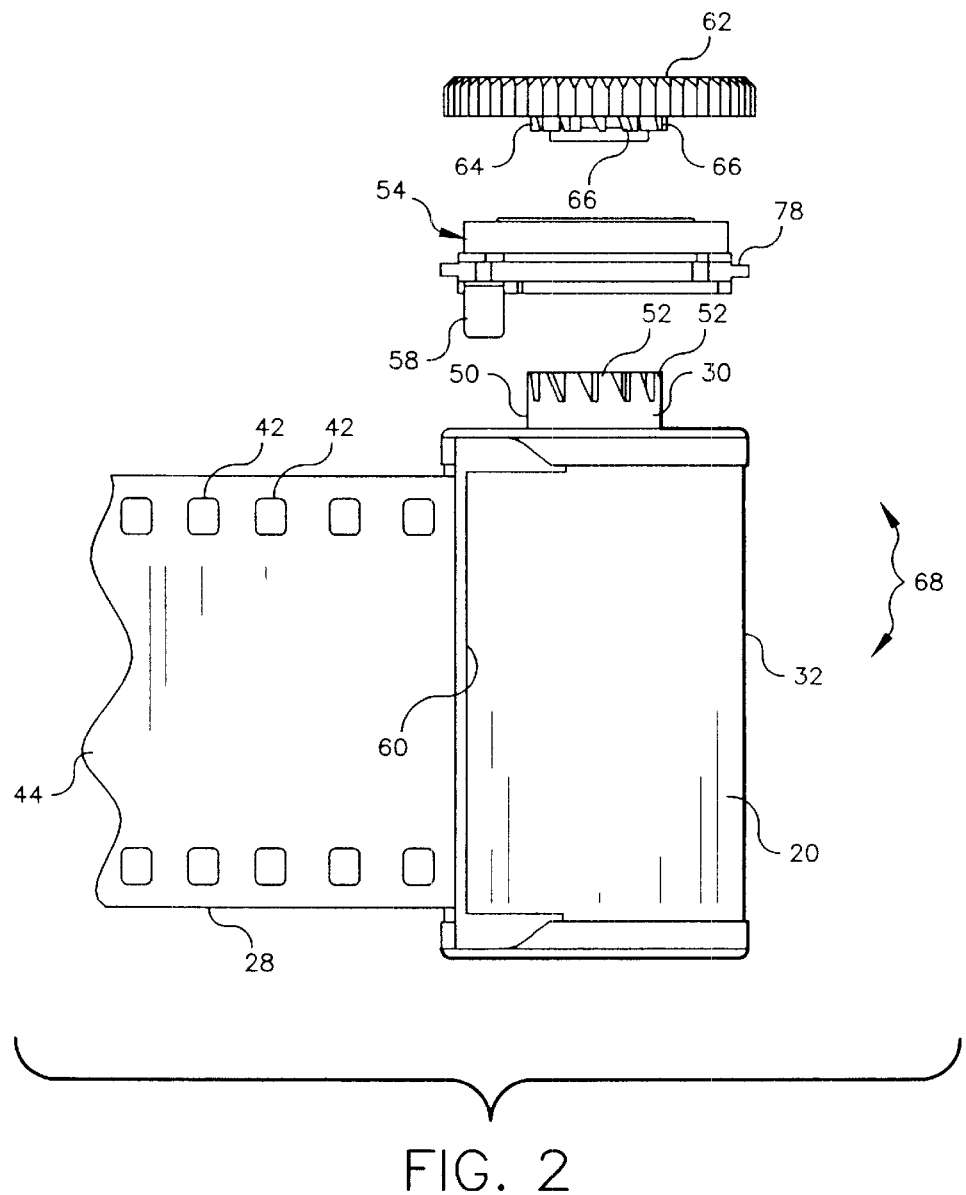
FIG. 2 is a rear elevation view of a film delivering unit in the camera.
Figure 3:
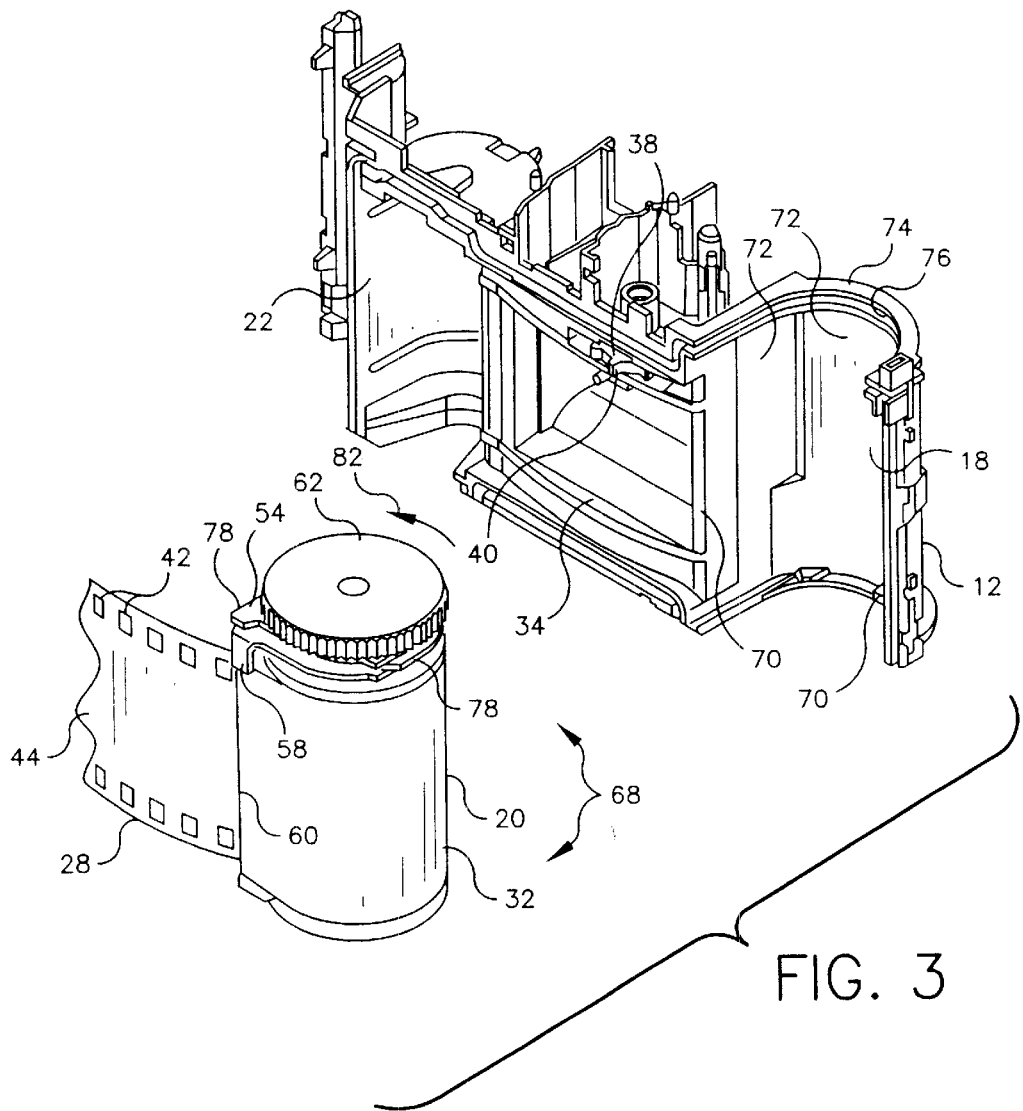
FIG. 3 is an exploded rear perspective view of the film delivering unit and a main body part of the camera.
Figure 4:
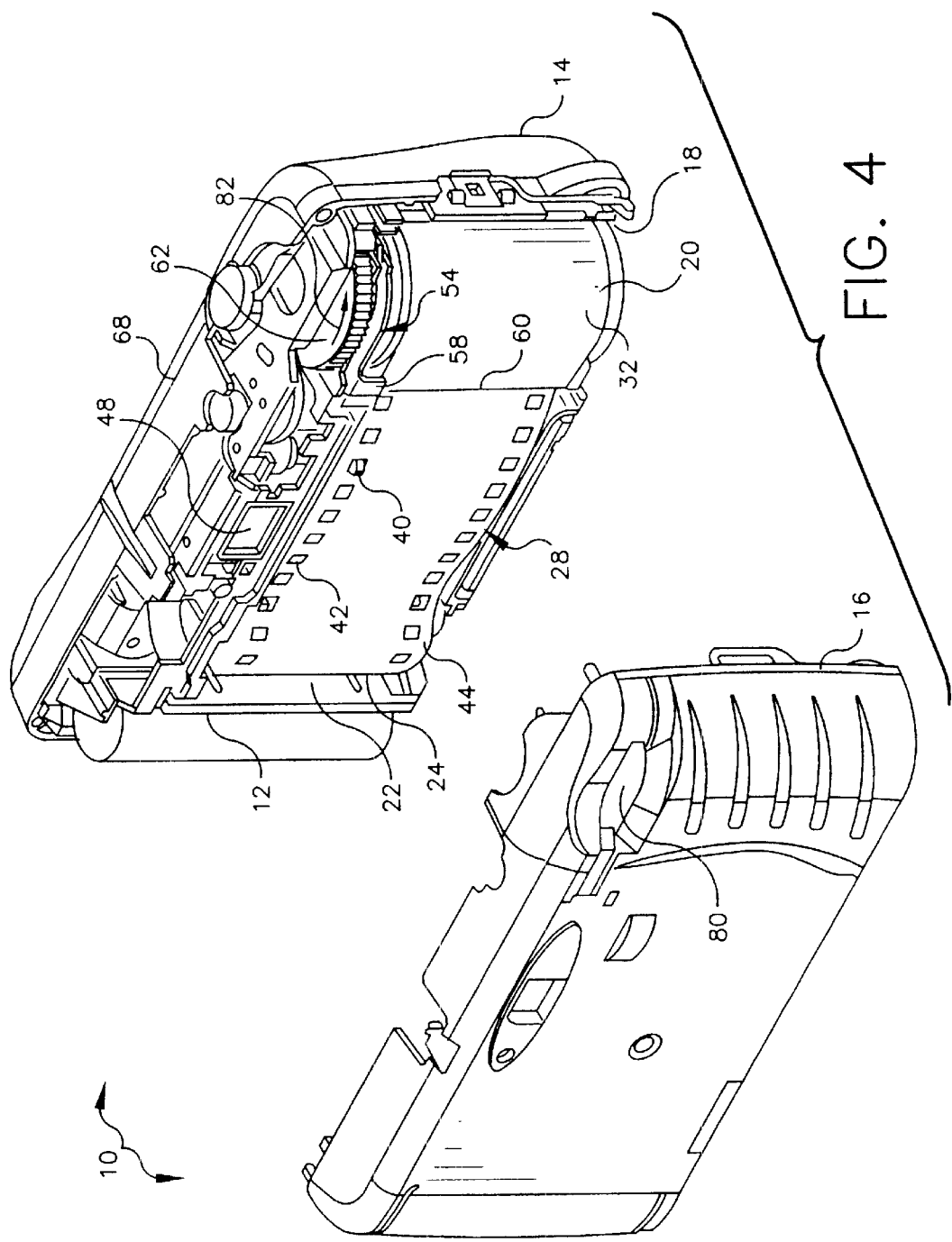
FIG. 4 is a rear perspective view of the camera shown assembled except for a separate rear cover part.
Figure 5:
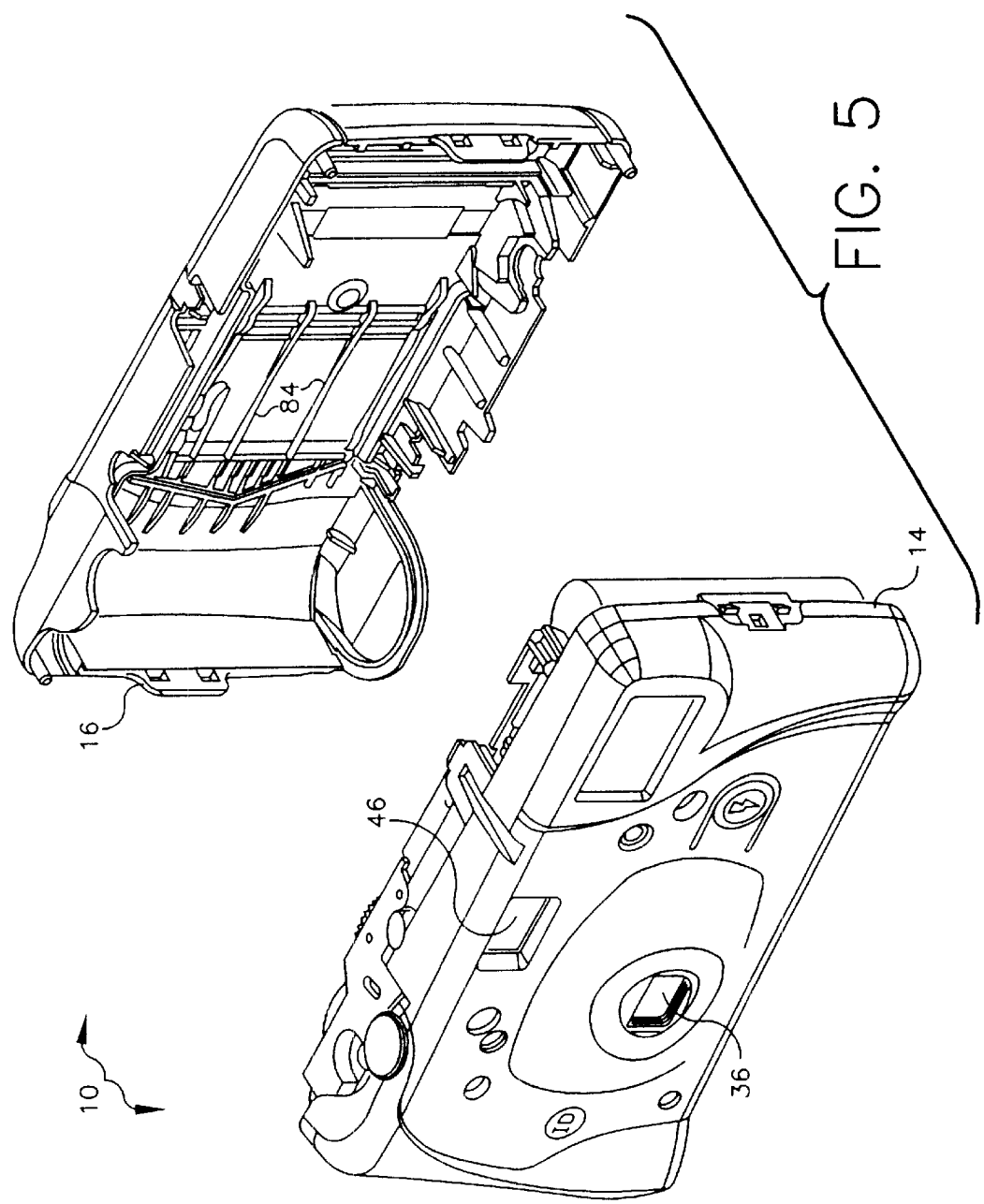
FIG. 5 is a perspective front view of the camera shown assembled except for the separate rear cover part.

As is typical, the main body part 12 has a rearwardly open cartridge receiving chamber 18 for a conventional film cartridge 20 and a rearwardly open film supply chamber 22 for an unexposed film roll 24 on a rotatable film supply spool 26. See FIGS. 1–5. During assembly of the camera 10, an unexposed filmstrip 28 (except for a trailing film end portion) is prewound from a rotatable film winding spool 30 in a cartridge shell 32 and into the unexposed film roll 24 on the film supply spool 26. A rearwardly open backframe opening 34 is located between the cartridge receiving chamber 18 and the film supply chamber 22 for exposing successive frames of the filmstrip 28 when ambient light is received through a front taking lens 36 on the main body part 12. A known film metering mechanism includes a metering sprocket 38 that is rotatably supported on the main body part 12, proximate the backframe opening 34, and has respective sprocket teeth 40 for engaging the filmstrip 28 at successive film perforations 42. FIG. 4 shows one of the sprocket teeth 40 projecting through one of the film perforations 42 to engage an intermediate film section 44 between the film winding spool 30 and the film supply spool 26.

A known optical viewfinder is mounted on top of the main body part 12 and has a pair of front and rear viewfinder lenses 46 and 48 for viewing a subject to be photographed. See FIGS. 1, 4 and 5.

An erect spool end portion 50 of the film winding spool 30 projects from the top of the cartridge shell 32 and has an evenly spaced series of end-notches 52. A cartridge retention piece 54 has a central opening 56 in which the spool end portion 50 is located when the cartridge retention piece is placed on top of the cartridge shell 32. See FIGS. 1–3. The cartridge retention piece 54 then encircles the spool end portion 50 and has a depending tab 58 against a film passage (film egress/ingress) snout 60 of the cartridge shell 32.

A rotatable film winding thumbwheel 62 has a depending coaxial stem 64 with respective teeth 66 to coaxially engage the spool end portion 50 at its end notches 52. During assembly of the camera 10, the stem 64 of the thumbwheel 62 is engaged with the spool end portion 50 immediately after the cartridge retention piece 54 is placed on top of the cartridge shell 32. See FIGS. 1–3. When the depending stem 64 of the thumbwheel 62 engages the spool end portion 50 (with the cartridge retention piece 54 then between the thumbwheel and the cartridge shell 32), the thumbwheel and the cartridge retention piece form an assembled film delivering unit 68 FIG. 2 shows the film delivering unit 68 unassembled, and FIG. 3 shows the film delivering unit assembled.

The cartridge receiving chamber 18 is substantially open at a rear side 70 and a top end 72 of the chamber to simultaneously allow the film cartridge 20 to be inserted into the chamber at the rear side and the cartridge retention piece 54 to be positioned at the top end. See FIGS. 3 and 4. The main body part 12 has a rim 74 with a groove 76 that light-tightly mates with a tongue 78 of the cartridge retention piece 54 when the cartridge retention piece is positioned at the top end 72 of the cartridge receiving chamber 18. This mating serves to connect the assembled film delivering unit 68 to the main body part 12 as shown in FIG. 4.

When the camera 10 is completely assembled, i.e., the rear cover part 16 is connected to the main body part 12, the thumbwheel 62 radially protrudes substantially from an elongate narrow opening 80 in the rear cover part in order to be manually grasped or fingered at its periphery to incrementally rotate the thumbwheel in a film winding direction 82, i.e., counter-clockwise in FIG. 1, to similarly rotate the film winding spool 30. This is done in order to wind an exposed frame of the filmstrip 28 from the backframe opening 34 into the film cartridge 20 after each film exposure, and to move a fresh frame of the filmstrip from the unexposed film roll 24 to the backframe opening.

The rear cover part 16 has known film guide ribs 84 that hold the film section 44 engaged with the metering sprocket 38. When the camera 10 is only partially assembled, i.e., before the rear cover part 16 is connected to the main body part 12, the film section 44 would be able to retract out of engagement with the metering sprocket 38 provided the film cartridge 20 is allowed to rotate in the film winding direction 82 within the cartridge receiving chamber 18. If the film section 44 disengages from the metering sprocket 38 and is not re-engaged with the metering sprocket before the rear cover part 16 is connected to the main body part 12, the camera 10 will be inoperative. This problem is prevented because the tab 58 against the film passage snout 60 prevents any rotation of the film cartridge 20 in the film winding direction 82

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. cartridge receiving chamber
20. film cartridge
22. film supply chamber
24. unexposed film roll
26. film supply spool
28. filmstrip
30. film winding spool
32. cartridge shell
34. backframe opening
36. front taking lens
38. metering sprocket
40. sprocket teeth
42. film perforations
44. intermediate film section
46. front viewfinder lens
48. rear viewfinder lens
50. spool end portion
52. end-notches
54. cartridge retention piece
56. central opening
58. depending tab
60. film passage snout
62. film winding thumbwheel
64. depending stem
66. teeth
68. film delivering unit
70. rear side
72. top side
74. rim
76. groove
78. tongue
80. narrow opening
82. film winding direction
84. film guide ribs

What is claimed is:

1. A partially assembled one-time-use camera comprising a film section that longitudinally extends from a rotatable film winding spool in a film cartridge to project from said film cartridge and that is engaged with a rotatable metering sprocket having respective sprocket teeth sized to project through successive perforations in said film section to engage said film section with said metering sprocket, and a separate rear cover part that is to be placed over said film section and said film cartridge and is constructed to prevent said film section from retracting out of engagement with said metering sprocket, is characterized in that:

said film winding spool is rotatable in a film winding direction to wind said film section into said film cartridge, and said film section will retract out of engagement with said metering sprocket when said film cartridge is allowed to rotate in the film winding direction; and a cartridge retention piece is positioned against said film cartridge to prevent said film cartridge from being rotated in the film winding direction when said rear cover part is not placed over said film section and said film cartridge, in order to prevent said film section from retracting out of engagement with said metering sprocket before said rear cover part is in place.

2. A partially assembled one-time-use camera as recited in claim 1, wherein a main body part has a chamber that contains said film cartridge loosely to allow said film cartridge to be rotated in the film winding direction and has a film-exposing backframe opening proximate said chamber, said metering sprocket is rotatably supported on said main body part proximate said backframe opening, and said cartridge retention piece prevents said film cartridge from being rotated within said chamber in the film winding direction.

3. A partially assembled one-time-use camera as recited in claim 2, wherein said cartridge retention piece and said main body part have a mating light-trapping tongue and groove.

4. A partially assembled one-time-use camera as recited in claim 1, wherein a film winding thumbwheel is coaxially engaged with said film winding spool to rotate said film winding spool in the film winding direction, and said cartridge retention piece is between said film cartridge and said thumbwheel.

5. A partially assembled one-time-use camera as recited in claim 4, wherein said film winding spool has a spool end portion that projects from said film cartridge and is coaxially engaged with thumbwheel, and said cartridge retention piece encircles said spool end portion and has a depending tab against said film cartridge to prevent the film cartridge from being rotated in the film winding direction.

6. A partially assembled one-time-use camera as recited in claim 5, wherein said film cartridge has a film passage snout, said film section longitudinally extends from said snout, and said tab is against said snout.

7. A partially assembled one-time-use camera as recited in claim 1, wherein a film winding thumbwheel is coaxially engaged with said film winding spool to rotate said film winding spool in the film winding direction, and said cartridge retention piece is between said film cartridge and said thumbwheel, in order that said thumbwheel, said cartridge retention piece and said film cartridge form a film delivering unit.

8. A partially assembled one-time-use camera as recited in claim 7, wherein, a main body part has a chamber that is substantially open at a rear and a top of said chamber to simultaneously allow said film cartridge to be inserted into said chamber at said rear and said cartridge retention piece to be positioned at said top.

9. A partially assembled one-time-use camera as recited in claim 8, wherein said main body part has a rim at said top of said chamber that light-tightly engages with said cartridge retention piece to connect said film delivering unit to said main body part.

10. A partially assembled one-time-use camera as recited in claim 1, wherein said film cartridge has a film passage snout, said film section longitudinally extends from said snout, and said cartridge retention piece abuts said snout to prevent said film cartridge from being rotated in the film winding direction.

11. A partially assembled one-time-use camera as recited in claim 1, wherein said film winding spool has a spool end portion that projects from said film cartridge, and said cartridge retention piece encircles said spool end portion and has a depending tab against said film cartridge to prevent the film cartridge from being rotated in the film winding direction.

12. A partially assembled one-time-use camera comprising a film section that longitudinally extends from a rotatable film winding spool in a film cartridge to project from said film cartridge and that is engaged with a rotatable metering sprocket having respective sprocket teeth sized to project through successive perforations in said film section to engage said film section with said metering sprocket, and a separate rear cover part that is to be placed over said film section and said film cartridge and is constructed to prevent said film section from retracting out of engagement with said metering sprocket, is characterized in that:

said film winding spool is rotatable in a film winding direction to wind said film section into said film cartridge, and said film section will retract out of engagement with said metering sprocket when said film cartridge is allowed to rotate in the film winding direction; and means prevents said film cartridge from being rotated in the film winding direction when said rear cover part is not placed over said film section and said film cartridge, for preventing said film section from retracting out of engagement with said metering sprocket before said rear cover part is in place.

13. A method of partially assembling a one-time-use camera, comprising:

placing a cartridge retention piece on top of a film cartridge to position a depending tab of the cartridge retention piece against a film passage snout of the film cartridge; and engaging the cartridge retention piece with a main body part as the film cartridge is inserted into a chamber in the main body part, in order for the tab to prevent the film cartridge from being rotated within the chamber.

14. A method as recited in claim 13, further comprising:

engaging a film winding thumbwheel with a film winding spool of the film cartridge.

15. A method as recited in claim 14, wherein the film winding thumbwheel is engaged with the film winding spool before the cartridge retention piece is engaged with the main body part, in order that the thumbwheel, the cartridge retention piece and the film cartridge form a film delivering unit.

16. A film delivering unit comprising:

a film cartridge including a cartridge shell, a rotatable film winding spool that is inside said cartridge shell and has a spool end portion that is accessible from outside said cartridge shell;

a film winding thumbwheel coaxially engaged with said spool end portion to rotate said film winding spool in a film winding direction; and a cartridge retention piece between said film winding thumbwheel and said cartridge shell that is engageable to prevent rotation of said cartridge shell in the film winding direction when said film winding spool is rotated in that direction.

17. A film delivering unit as recited in claim 16, wherein said cartridge shell has a film passage snout, and said cartridge retention piece has a tab against said snout to prevent said cartridge shell from being rotated in the film winding direction.

* * * * *